United States Patent
Kakinada et al.

(10) Patent No.: US 10,165,620 B2
(45) Date of Patent: Dec. 25, 2018

(54) NETWORK MANAGEMENT AND WIRELESS CHANNEL TERMINATION

(71) Applicant: Time Warner Cable Enterprises LLC, New York, NY (US)

(72) Inventors: Umamaheswar A. Kakinada, Carpentersville, IL (US); Arun Manroa, Herndon, VA (US); Rajesh M. Gangadhar, Ashburn, VA (US); Praveen C. Srivastava, Ashburn, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/605,428

(22) Filed: May 25, 2017

(65) Prior Publication Data

US 2017/0359851 A1 Dec. 14, 2017

Related U.S. Application Data

(62) Division of application No. 15/180,298, filed on Jun. 13, 2016, now Pat. No. 9,681,490.

(51) Int. Cl.
*H04W 76/36* (2018.01)
*H04W 36/08* (2009.01)
*H04W 16/14* (2009.01)
*H04W 72/04* (2009.01)
*H04W 36/16* (2009.01)

(52) U.S. Cl.
CPC ........... *H04W 76/36* (2018.02); *H04W 16/14* (2013.01); *H04W 36/08* (2013.01); *H04W 72/0453* (2013.01); *H04W 72/0486* (2013.01); *H04W 36/165* (2013.01)

(58) Field of Classification Search
CPC ......... H04W 72/0453; H04W 72/0486; H04W 76/066; H04W 76/36; H04W 36/08; H04W 36/165; H04W 16/14
See application file for complete search history.

(56) References Cited

U.S. PATENT DOCUMENTS

| | | | |
|---|---|---|---|
| 8,351,952 B1 * | 1/2013 | Woleben | H04W 36/026 370/328 |
| 9,351,221 B2 | 5/2016 | Hong et al. | |
| 2006/0072493 A1 | 4/2006 | Ginzburg et al. | |
| 2012/0250658 A1 * | 10/2012 | Eisl | H04L 63/1458 370/331 |
| 2015/0358885 A1 * | 12/2015 | Choi | H04W 36/22 455/438 |

* cited by examiner

Primary Examiner — Wayne H Cai
(74) *Attorney, Agent, or Firm* — Armis IP Law, LLC

(57) ABSTRACT

According to one configuration, an access point control resource receives channel allocation information indicating a change to allocation of channels in a wireless band currently used by multiple wireless access points to communicate with multiple communication devices in a network. The access point control resource uses the channel allocation information to identify a particular wireless channel (such as a de-allocated wireless channel) to be terminated from use by the multiple wireless access points. In accordance with the channel allocation information, when vacating use of the de-allocated channel, the access point control resource controls an order of terminating use of the particular wireless channel by the multiple wireless access points.

31 Claims, 14 Drawing Sheets

NETWORK MANAGEMENT AND WIRELESS CHANNEL TERMINATION

RELATED APPLICATIONS

This application is a divisional of earlier filed U.S. patent application Ser. No. 15/180,298 entitled "NETWORK MANAGEMENT AND WIRELESS CHANNEL TERMINATION," filed on Jun. 13, 2016, the entire teachings of which are incorporated herein by this reference.

BACKGROUND

In general, and as well known, the available wireless frequency spectrum is split up into many different bands and is used for many different purposes.

For example, some portions of the available wireless spectrum are sold or licensed to operators of private radio transmission services (such as, cellular telephone operators or broadcast television stations); other portions of the available wireless spectrum (non-licensed portion) are allocated for general authorized access users; yet other portions of the available wireless spectrum are allocated for use by the government (military).

Typically, use of an allocated band of the wireless frequency spectrum includes breaking up a respective portion of the wireless frequency spectrum to include one or more channels. In certain instances, such as when a respective band supports wireless communications amongst cell phone subscribers, the channels are allocated for use between a wireless access point (such as a cell phone tower) and a corresponding communication device (such as a cell phone device) to support respective wireless communications. Communications over multiple adjacent channels helps to avoid interference amongst the respective channels in a band.

A newly proposed type of wireless band (such as a shared wireless band between 3.550 MHz and 3.700 MHz band) is shared by multiple different types of entities including government users (such as the military), licensed users, and non-licensed users. It has been proposed that non-licensed users (the general authorized access users) in the band are afforded lowest priority and can be notified, at any time, to discontinue using a portion of the band during instances in which the band is needed for alternative purposes by a higher priority entity such as an incumbent user.

BRIEF DESCRIPTION OF EMBODIMENTS

The present disclosure includes the observation that accommodating a change in channel allocation in a shared wireless band (such as a wireless band shared by the government, licensed users, and non-licensed users) can be disruptive to corresponding low priority users, rendering it difficult to use a wireless band also shared by high priority entities such as the government.

For example, assume that a particular wireless access point supports communications with multiple communication devices. Assume further that the wireless access point receives notification to discontinue using one or more wireless channels that presently supports the communications with the multiple communication devices (such as low priority users). In such an instance, in accordance with the received notification, low priority resources such as the wireless access point and/or corresponding multiple communication devices must discontinue use of the de-allocated wireless channels. The low priority users may attempt to us alternative wireless channels. A de-allocation and reallocation process can be quite complex, especially if there are many wireless access points and corresponding communication devices that must abandon use of the de-allocated wireless channel in favor of using one or more other available wireless channel.

Embodiments herein include providing orderly and/or timely termination of using wireless channels in a communication system in response to de-allocation of a particular wireless channel from further use.

More specifically, in one embodiment, a management resource (via respective computer processor hardware and/or executed set of software/firmware instructions) controls use of wireless channels by one or more communication devices in accordance with received channel allocation information. The received channel allocation information can change over time. In other words, a particular channel that was previously allocated for use by low priority users can be de-allocated from further use by low priority users to accommodate use of the particular wireless channel by another higher priority entity claiming use of the particular wireless channel.

For illustrative purposes, assume that newly received channel allocation information indicates a change to allocation of channels in a wireless spectrum (band) by multiple wireless access points in a network. Assume further that a particular channel that was previously available for use (and in current use) is being de-allocated from use by the wireless access points and corresponding communication devices. In such an instance, the management resource as described herein utilizes the channel allocation information to identify the particular wireless channel to be terminated from use by the multiple wireless access points.

For example, to provide efficient and potentially continuous wireless communications to end user devices, the management resource further controls a sequential order of terminating use of the particular wireless channel amongst the multiple wireless access points. In one embodiment, instead of controlling all of the multiple wireless access points from discontinuing use of the de-allocated particular wireless channel at the same time or randomly, embodiments herein include a methodical approach of, in accordance with an order, de-allocating (such as discontinuing use of) the particular wireless channel amongst the wireless access points at different times. Accordingly, yet further embodiments herein include, in accordance with a specified order of multiple phases, discontinuing use of the particular wireless channel amongst the wireless access points at different times.

Note further that the order to terminate use of the particular wireless channel (or multiple channels) may be derived based on respective data communication loads (such as an amount (such as magnitude) of wireless data traffic between respective wireless access points and multiple communication devices, number of communication devices, etc.), supported by each of the wireless access points. More specifically, in one embodiment, an access point controller resource or other suitable resource can be configured to produce the order to initially terminate use of the particular wireless channel (such as via handoffs) by first wireless access points supporting lighter data communication loads followed by second wireless access points supporting heavier data communication loads.

In accordance with further embodiments, note that the management resource may have a limited amount of time in which to discontinue use of the particular wireless channel after receiving a de-allocation notification. To limit an impact to communication devices that are currently in communication with a respective wireless access point using the particular wireless channel being de-allocated, the management resource timely controls the sequential order of terminating use of the particular wireless channel by the multiple wireless access points such that de-allocation of use is performed within a respective time limit and each of the communication devices is provided continuous or near continuous communications with a network such as the Internet.

As further discussed herein, controlling the order of terminating use of the wireless channel by the multiple wireless access points can include scheduling termination of use of the wireless channel at different times amongst the multiple wireless access points such that a first portion of the multiple wireless access points supports communications over a new or available wireless channel (potentially as indicated by the channel allocation information) while a second portion of the multiple wireless access points temporarily supports communications over the particular wireless channel being terminated. In accordance with the scheduled ordered manner of de-allocating usage of the particular wireless channel (channel being de-allocated), eventually, all of the wireless access points discontinue using the particular wireless channel in accordance with the scheduled termination.

The scheduled, orderly termination of using the particular wireless channel by the wireless access point can include multiple phases. For example, to implement new bandwidth usage requirements as specified by updated channel allocation information, during a first phase of the multiple phases, the management resource terminates use of the particular wireless channel by a first wireless access point. The management resource controls the first wireless access point to use a second wireless channel (such an available wireless channel that is allocated for use) to support subsequent wireless communications. Subsequent to the first phase, during a second phase of the multiple phases, the management resource terminates use of the particular wireless channel by a second wireless access point. The management resource controls the second wireless access point to use a different wireless channel to support subsequent wireless communications. Subsequent to the second phase, during a third phase of the multiple phases, the management resource terminates use of the particular wireless channel by a third wireless access point. The management resource controls the third wireless access point to use a different wireless channel to support subsequent wireless communications, and so on.

Terminating use of the particular channel amongst the wireless access points in accordance with the scheduled order can further include initiating handoffs of communication devices to provide continuous communications (such as access to a respective remote network such as the Internet) to the communication device that is being handed off.

For example, in accordance with further embodiments, assume that the multiple wireless access points include a first wireless access point and a second wireless access point. Assume further that the first wireless access point currently uses the particular wireless channel to communicate with a first set of communication devices and that the second wireless access point uses the wireless channel to communicate with a second set of wireless access points. To provide orderly and scheduled termination of use of the particular wireless channel, the management resource notifies the first wireless access point to terminate use. To accommodate the termination, the first wireless access point discontinues using the particular wireless channel to communicate with the first set of communication devices. This can include forcing the set of communication devices to handoff to another wireless access point. After the first wireless access point completes termination of using the particular wireless channel being terminated, the first wireless access point is free to provide communications over one or more new or previously allocated channels that have not been terminated.

Additionally, in furtherance of de-allocating use of the particular wireless channel, the management resource notifies and causes the second wireless access point to terminate use of the particular wireless channel in a similar manner such that each of multiple wireless access points discontinues using the de-allocated wireless channel.

As previously discussed, the management resource can be notified of updated channel allocation information indicating a change in channel allocation based upon demanded use of the particular channel by another entity (such as an incumbent entity having higher priority). In other words, the channel allocation information received by the management resource can indicate the change in usage of the wireless spectrum to accommodate use of the particular wireless channel by an entity other than the multiple wireless access points.

In one embodiment, in accordance with shared band usage requirements associated with the shared wireless band, the management resource completes termination of using the wireless channel by the multiple wireless access points to be within a specified time limit. Accordingly, the particular channel can be made available to another entity within a known amount of time of the management resource receiving a command to terminate use.

As previously discussed, the orderly termination of using the particular wireless channel can include forcing handoffs of communication devices from a first wireless access point of the multiple wireless access points to one or more other wireless access points to terminate use of the particular wireless channel by the first wireless access point and then repeating this process for a sequence of multiple wireless access points.

In accordance with yet further embodiments, during channel termination, and via wireless access point handoffs, the management resource provides continuity of first data delivery services to the first set of communication devices, and provides continuity of data delivery services to the second set of communication devices. More specifically, the management resource discontinues use of the terminated (particular) wireless channel to support communications with the first set of communication devices and initiates use of a second wireless channel to support continued communications with the first set of communication devices.

In one embodiment, the handoffs are performed in an appropriate manner to ensure that the communication devices do not experience a downtime or experience little downtime when communicating over a respective wireless communication link to server resources in a network.

Further embodiments herein include a method, system, computer-readable media, etc., supporting operations of: receiving channel allocation information indicating to adjust usage of a particular wireless channel by multiple wireless access points in a network environment; and controlling an order of adjusting the usage of the particular wireless channel by the multiple wireless access points.

Note that the channel allocation information or channel usage modifications as described herein can include one or more commands indicating to perform any type of modification to wireless channel usage. For example, as previously discussed, in one embodiment, the channel allocation information includes one or more commands indicating to terminate use of one or more particular wireless channels.

In accordance with other embodiments, the channel allocation information (bandwidth usage settings) can be configured to indicate to adjust power levels of the multiple wireless access points transmitting communications over the particular wireless channel. Adjusting the power levels of using one or more particular wireless channels currently in use enables another entity (such as a higher priority user) to use the one or more particular wireless channel with less or without interference by the wireless access points.

Similar to prior discussed embodiments, to accommodate adjusting the usage of the particular wireless channel (such as via lower power output levels) by the multiple wireless access points, embodiments herein can include, when appropriate, initiating handoffs of communication devices amongst the wireless access points. For example, a given wireless access point may initially provide (via use of the particular wireless channel) large cell coverage and support communications with devices located far away from the given wireless access point. The channel allocation information can indicate to reduce power output transmit level of the given wireless access point over the particular wireless channel such that given wireless access point only provides small cell coverage instead of large cell coverage. In such an instance, certain communication devices outside the small cell coverage area are handed off to one or more other wireless access points.

Further, as previously discussed, embodiments herein include controlling an order of modifying use of one or more wireless channels. For example, in accordance with further embodiments, in a manner as specified by the order, a management resource (such as an access point controller resource) can be configured to adjust use of a particular wireless channel amongst multiple wireless access points such that the wireless access points adjust their respective transmitter power output levels over the particular wireless channel at different times. Thus, in addition to controlling an order of de-allocating or discontinuing use of a respective currently used wireless channel, embodiments herein can include adjusting a respective order of adjusting transmit power output levels from each of multiple wireless access points such that the wireless access points do not all change power output levels of the same time. This ensures an orderly handoff of affected communication devices to other wireless access points.

As previously discussed, embodiments herein can include deriving the order to adjust use of the particular wireless channel in a respective power output levels based on respective wireless communications loads supported by each of the wireless access points. Additionally, embodiments herein can include completing power level adjustment of using the particular wireless channel by the multiple wireless access points to be within a specified time limit. Embodiments herein are useful over conventional techniques. For example, as previously discussed, accommodating a change in channel allocation can be disruptive to current low priority users, rendering it difficult to provide efficient use of a wireless band shared by entities such as incumbent users, licensed users, and non-licensed users. The scheduled orderly de-allocation of one or more wireless channels as described herein helps to ensure that the wireless frequency spectrum is utilized to its fullest potential. That is, during times when higher priority users are not using the shared wireless band, the shared wireless band is used to support communications amongst lower priority users such as cell phone users. However, in response to conditions in which higher priority users claim use of the shared band, the lower priority users are forced to use a corresponding smaller portion of the available band or no portion of the band. Thus, a band is not wasted when high priority entities do not use it. Embodiments herein facilitate the graceful transition of providing continued communications to lower priority users in light of a reduced available wireless bandwidth in the shared wireless channel.

Further embodiments herein include mobility optimization, enhanced wireless network resource utilization and user plane throughput, reduced service disruption and enhance service continuity during channel vacation/change from mobile communication devices small cell cluster by an SAS (Spectrum Access System) that dynamically controls allocation of wireless channels amongst multiple different types of users.

These and other more specific embodiments are disclosed in more detail below.

Note that any of the resources as discussed herein can include one or more computerized devices, wireless access points, mobile playback devices, servers, base stations, wireless playback equipment, playback management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or other a medium such as firmware in one or more ROM, RAM, PROM, etc., and/or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, computer-readable media, etc., that supports operations as discussed herein.

One embodiment includes a computer readable storage media and/or a system having instructions stored thereon to facilitate discontinued use of a wireless channel amongst multiple wireless access points. For example, in one embodiment, the instructions, when executed by computer processor hardware, cause the computer processor hardware (such as one or more processor devices) to: receive channel allocation information indicating a change to allocation of channels in a wireless spectrum used by multiple wireless access points in a network; utilize the channel allocation information to identify a particular wireless channel to be terminated from use by the multiple wireless access points;

and control an order of terminating use of the particular wireless channel by the multiple wireless access points.

Yet another embodiment herein includes computer readable storage media and/or a system having instructions stored thereon to facilitate discontinued use of a wireless channel amongst multiple wireless access points. For example, the instructions, when executed by a respective computer device (computer processor hardware), cause a processor or multiple processors (computer processor hardware) to: manage multiple wireless access points to provide wireless network access to multiple communication devices in a network environment; receive channel allocation information indicating to terminate use of a first wireless channel by the multiple wireless access points; and initiate handoffs of the communication devices to initiate termination of using the first wireless channel and use of the second wireless channel amongst the multiple wireless access points.

Yet another embodiment herein includes computer readable storage media and/or a system having instructions stored thereon to facilitate adjustment of using a wireless channel used by multiple wireless access points. For example, the instructions, when executed by a respective computer device (computer processor hardware), cause a processor or multiple processors (computer processor hardware) to: receive channel allocation information indicating to adjust usage of a particular wireless channel by multiple wireless access points in a network environment; and control an order of adjusting the usage of the particular wireless channel by the multiple wireless access points.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless communications and specifically small cell phone technology. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
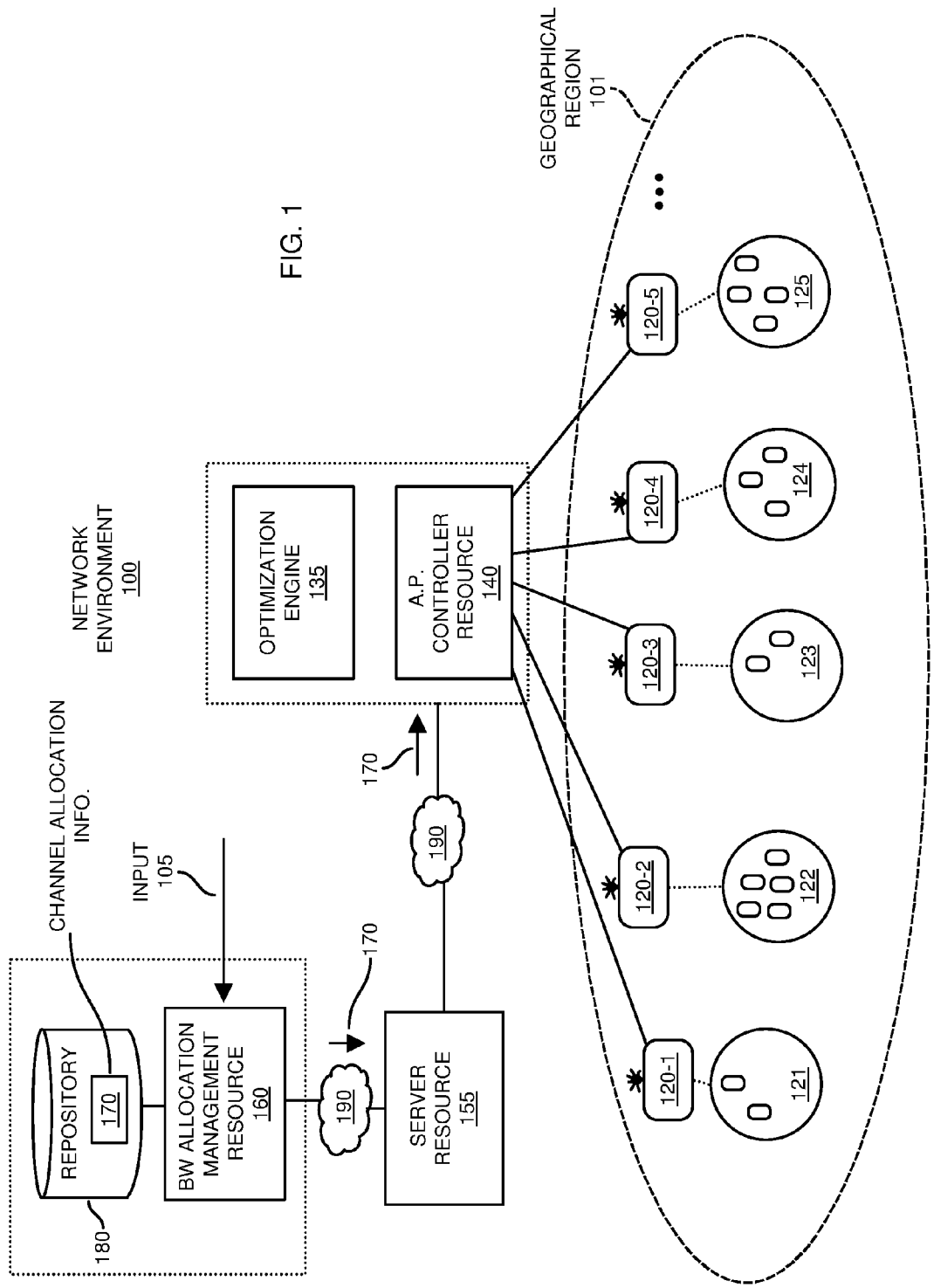
FIG. 1 is an example diagram illustrating a network environment implementing shared use of bandwidth by different priority users according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, more specifically, FIG. 1 is an example diagram illustrating a network environment according to embodiments herein.

As shown, network environment 100 (such as a wireless network) includes access point controller resource 140 and multiple wireless access points 120 (namely, wireless access point 120-1, wireless access point 120-2, wireless access point 120-3, wireless access point 120-4, wireless access point 120-5, etc.). As shown, each of the wireless access points 120 resides in geographical region 101. The wireless access points 120 support wireless communications in accordance with any suitable wireless protocol.

In one embodiment, the aggregation of wireless access points 120 in the geographical region 101 is a so-called small cell cluster that share use of the same band in a wireless spectrum. By way of non-limiting example embodiment, each of the wireless access points 120 (a.k.a., long or short range cellular base stations) supports wireless communications in accordance with any of one or more wireless protocols including, for example, CDMA (Code Division Multiple Access), GSM (Global System for Mobile communications), any LTE (Long Term Evolution) standards, etc. The band (such as between 3.55 and 3.70 MHz or other suitable band) allocated for use by the wireless access points 120 can be split into multiple channels (such as 10 MHz channels). The wireless access points 120 share use of the same one or more available allocated) channels in the shared band to provide wireless connectivity to respective mobile communication devices (such as phones, computer devices, etc.).

In accordance with further embodiments, each of the wireless access points 120 provides wireless coverage in a so-called small cell region within geographical region 101. The wireless coverage provided by each wireless access point can be over lapping or non-overlapping with respect to each other. For example, any of one or more of the wireless access points 120 can be configured to provide wireless coverage in the whole geographical region 101, a less-than-all portion of the geographical region 101, etc.

In one embodiment, the wireless access points 120 share use of one or more available wireless channels available in a shared wireless spectrum.

For example, in one non-limiting example embodiment, the band allocated for use by the multiple wireless access points (and potentially other entities) resides in the wireless spectrum such as between 3.550 MHz and 3.700 MHz band.

In one embodiment, this band used by wireless access points 120 is shared by government users (high priority users such as the military or government), licensed users (such as mid priority users that pay a fee), and non-licensed users (low priority users that use a general authorized access tier).

In this example embodiment, the non-licensed users (general authorized access users) are afforded lowest priority (such as a service provider of wireless access points 120) is notified when to discontinue using any or all of a portion of the band during instances in which the band is needed for alternative purposes by higher priority entities.

During operation, each of the wireless access points 120 supports wireless communications with one or more corresponding communication devices using one or more allocated channels. In one embodiment, the wireless access points 120 provide respective users operating communication devices 121, 122, 123, etc., access through network 190 to a remote network such as the Internet. Accordingly, the wireless channels supporting communications between the wireless access points 120 and the respective mobile communication devices are two-way wireless communication links.

More specifically, in this example embodiment, wireless access point 120-1 supports wireless communications with communication devices 121; wireless access point 120-2 supports wireless communications with communication devices 122; wireless access point 120-3 supports communications with communication devices 123; wireless access point 120-4 supports wireless communications with communication devices 124; wireless access point 120-5 supports wireless communications with communication devices 125; and so on.

As previously discussed, the wireless bandwidth used by the wireless access points 120 to support communication with respective mobile communication devices is shared amongst multiple different types of users. The bandwidth allocation management resource 160 manages allocation of bandwidth for use in geographical region 101.

Assume that the bandwidth allocation management resource 160 receives input 105 from any suitable resource such as incumbent entity indicating whether or not a respective high priority incumbent resource needs to use a portion of the shared wireless spectrum. Based on the received input 105, the bandwidth allocation management resource 160 dynamically updates the channel allocation information to accommodate the incumbent resource. In one embodiment, the bandwidth allocation management resource 160 produces and stores channel allocation information 170 (bandwidth allocation settings) in repository 180.

In addition to creating and storing the content channel allocation information 170 in repository 180, the bandwidth allocation management resource 160 distributes corresponding channel allocation information 170 to server resource 155. In one embodiment, the bandwidth allocation management resource 160 distributes the channel allocation information 170 in response to detecting a change in allocation of bandwidth amongst the different types of users. Distribution of the channel location information 170 ensures that the respective notified entities are informed of what channels are available for use at any given time.

More specifically, server resource 155 further distributes the constantly updated channel allocation information 170 to one or more appropriate resources such as access point controller resource 140. Accordingly, via the channel allocation information 170, the access point controller resource 140 is constantly informed of which, if any, wireless channels are currently available for use by the respective wireless access points 120.

Note that the bandwidth allocation manager resource 160 can be configured to operate in any suitable manner to distribute the channel allocation information 170. For example, the bandwidth allocation management resource 160 can be configured to automatically push (without receiving a request) the channel allocation information 170 to server resource 155 that in turn communicates the updated channel allocation information 170 to the access point controller resource 140. Alternatively, the access point controller resource 140 can be configured to poll (such as via generating a query) to the server resource 155 for retrieval of newly available channel allocation information 170 from the bandwidth allocation management resource 160.

In accordance with further embodiments, the access point controller resource 140 includes an optimization engine 135 (control/scheduler/management resource) to ensure that the wireless access points 120 in geographical region 101 are in conformance with respect to use of wireless channels as specified by the channel allocation information 170. In the event that there is a change of allocation of wireless channels for use in the geographical region 101, as further described herein, the optimization engine 135 determines a suitable way in which to modify usage of the wireless channels by the wireless access points 120 such that the wireless access points use only allocated channels as specified by the received channel allocation information 170.

In one embodiment, as further discussed below, the received channel allocation information 170 may indicate to vacate use of one or more wireless channels with respect to previous bandwidth allocation in geographical region 101. In such an instance, the optimization engine 135 controls an order of vacating the one or more channels as further discussed below.

In one embodiment, even though one or more channels are vacated (de-allocated), the optimization engine 135 can be configured to provide respective users of communication devices continuous access to a respective network such as the Internet even though a cur channel is de-allocated from use.

As previously discussed, the channel allocation information 170 can include one or more commands or notifications indicating to perform any type of modification to wireless channel usage in the network environment 100. For example, as previously discussed, in one embodiment, the channel allocation information includes one or more commands indicating to terminate use of a particular wireless channel.

In accordance with other embodiments, note that the channel allocation information 170 can be configured to indicate to adjust wireless power output levels of the multiple wireless access points transmitting communications over a particular wireless channel. Adjusting the power levels of using one or more particular wireless channels currently in use enables another entity (such as a higher priority users) to use the one or more particular wireless channel without interference by the wireless access points.

Similar to prior discussed embodiments, to accommodate adjusting the usage of a particular wireless channel (such as via lower power output levels) by the multiple wireless access points 120, embodiments herein can include, when appropriate, initiating handoffs of communication devices amongst the wireless access points 122. For example, a given wireless access point 120-1 may initially provide (via use of the particular wireless channel) large cell coverage and support communications with devices located far away from the given wireless access point 120-1. The channel allocation information 170 (as received by the access point controller resource 140) can indicate to reduce power output transmit level of the given wireless access point 120-1 over the particular wireless channel such that given wireless access point 120-1 only provides small cell coverage instead of large cell coverage. In such an instance, certain communication devices outside the small cell coverage are handed off to one or more other wireless access points.

Further, embodiments herein include controlling an order of modifying use of one or more wireless channels used in network environment 100. In other words, the access point controller resource 140 can be configured to control the wireless access points 120 such that they do not all simultaneously change a respective output transmit level to accommodate received channel allocation information 170 indicating to reduce a power level of using a channel in the geographical region 101. Instead, in a manner as specified by a generated order, the access point controller 140 can be configured to adjust use of a particular wireless channel amongst multiple wireless access points such that the wireless access points adjust transmitter power output levels over the particular wireless channel at different times.

Thus, in addition to, or as an alternative to, controlling an order of de-allocating or discontinuing use of a respective currently used wireless channel, embodiments herein can include adjusting a respective order of adjusting transmit power output levels from each of multiple wireless access points such that the wireless access points do not all change power output levels of the same time.

Figure 2:
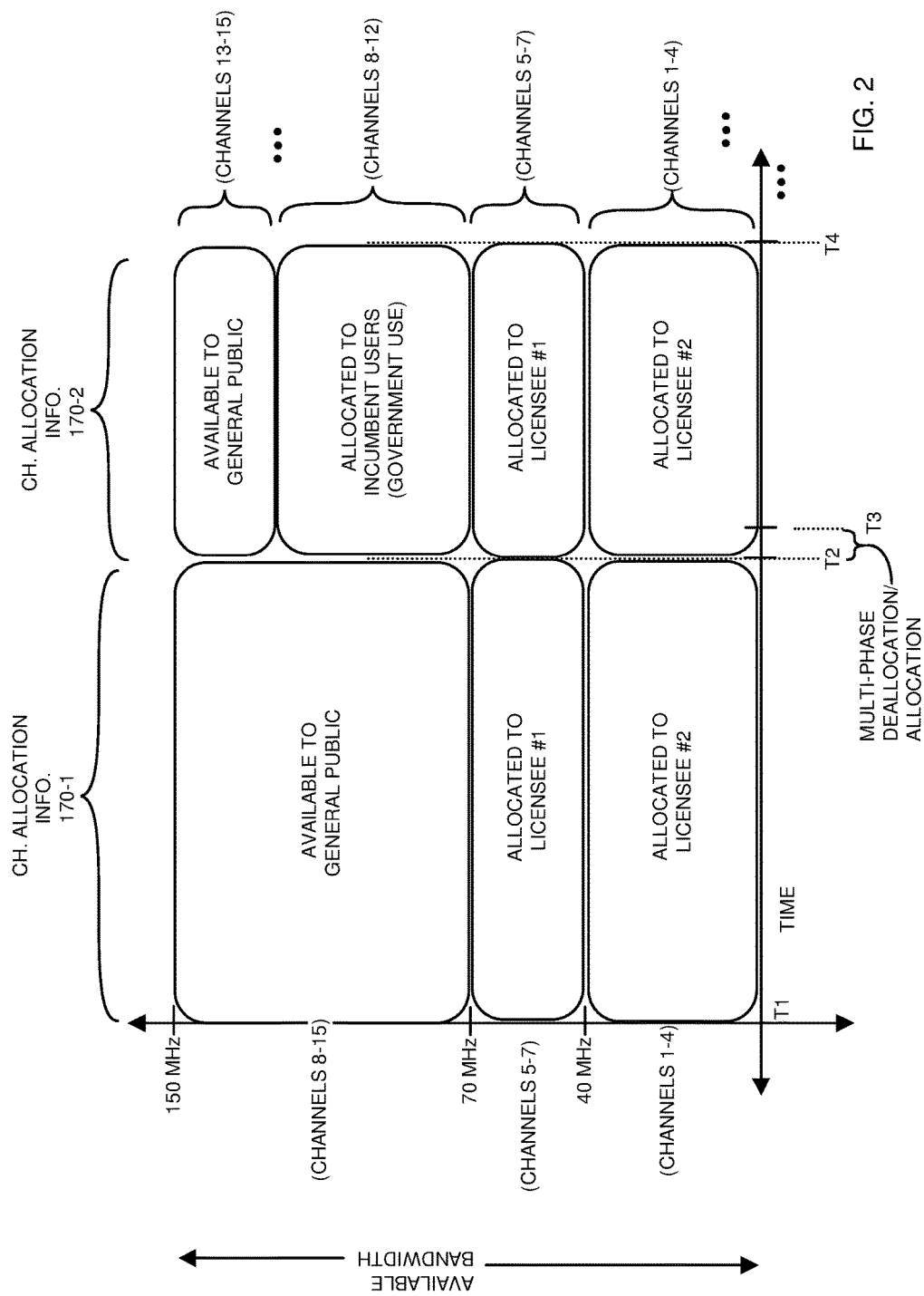
FIG. 2 is an example diagram illustrating dynamic allocation of bandwidth according to embodiments herein.

FIG. 2 is an example diagram illustrating distribution of channel allocation information and allocation of different portions of available bandwidth by the different tiers of users according to embodiments herein.

In this example, the content allocation information 170-1 indicates applicable between time T1 and time T2, channels 8-15 are available to the general authorized access users (low priority users) for use; licensee #1 is allocated use of channels 5-7; licensee #2 is allocated use of channels 1-4.

As further shown, subsequent time T2, the channel allocation information 170-2 indicates that channels 13-15 are allocated as being available to the general authorized access users; channels 8-12 are assigned for use by an incumbent entity requesting use; channels 5-7 are allocated for use by a first licensee; channels 1-4 are allocated for use by a second licensee. Thus, after time T2, the wireless channels 8-12 are no longer available for use by the low priority users (i.e., general authorized access users).

Referring to both FIG. 1 and FIG. 2, between time T1 and time T2, in accordance with corresponding channel allocation information 170-1, the access point controller resource 140 controls operation of the wireless access points 120 such that the wireless access points 120 use any of one or more channels 8-15 to support communications with respective communication devices.

As previously discussed, allocation of the wireless channels in the shared available bandwidth 220 can change over time. Assume in this example embodiment, at or around time T2, assume that the bandwidth allocation management resource 160 receives input 105 (from any suitable resource) indicating that a specified amount of bandwidth (such as 50 MHz such as 5 channels, each providing 10 MHz bandwidth) is needed by the incumbent entity. In such an instance, the bandwidth allocation management resource 160 updates the channel allocation information 170 stored in repository 180 to accommodate the need for bandwidth by the incumbent entity. For example, as mentioned, wireless channels 8-12 are allocated for use by the incumbent entity between time T3 and T4.

In order to provide appropriate bandwidth to the incumbent resource 150, the bandwidth allocation management resource 160 produces channel allocation information 170-2, which is applicable in this example between time T2 and time T4.

To effectuate the change in bandwidth, and use of the wireless channels 8-12 by the incumbent resource, the bandwidth allocation management resource 160 initiates distribution of the channel allocation information 170-2 over the network 190 through server resource 155 to access point control resource 140 and optimization engine 135.

In response to receiving notification of the change in bandwidth allocation as specified by the channel allocation information 170-2, based on an order specified by the optimization engine 135, the access point controller resource 140 communicates with the wireless access points 120 to vacate (terminate) use of wireless channels 8-12 in favor of using only allocated wireless channels 13-15 to support continued communications.

Figure 3:
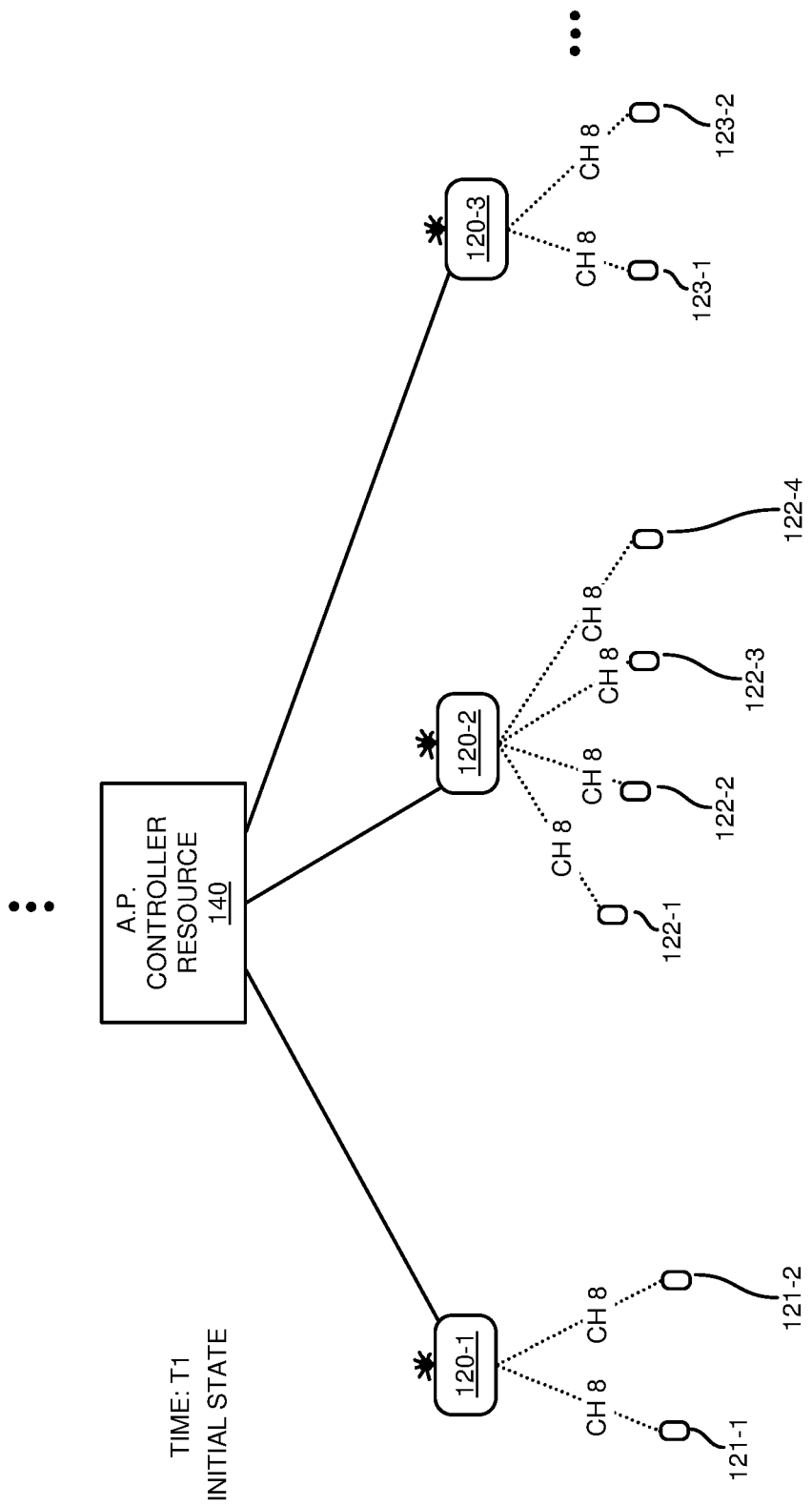
FIG. 3 is an example diagram illustrating an initial state of multiple wireless access points communicating with multiple communication devices using available bandwidth according to embodiments herein.

FIG. 3 is an example diagram illustrating use of allocated wireless channels by the access point controller resource according to embodiments herein.

As shown, between time T1 and time T2, in accordance with channel allocation information 170-1, wireless access point 120-1 supports wireless communications over wireless channel #8 to communication device 121-1; wireless access point 120-1 supports wireless communications over wireless channel #8 to communication device 121-2.

Additionally, between time T1 and time T2, in accordance with channel allocation information 170-1, Wireless access point 120-2 supports wireless communications over wireless channel #8 to communication device 122-1; wireless access point 120-2 supports wireless communications over wireless channel #8 to communication device 122-2; wireless access point 120-2 supports wireless communications over wireless channel #8 to communication device 122-3; wireless access point 120-2 supports wireless communications over wireless channel #8 to communication device 122-4; and so on.

Additionally, between time T1 and time T2, in accordance with channel allocation information 170-1, wireless access point 120-3 supports wireless communications over wireless channel #8 to communication device 123-1; wireless access point 120-3 supports wireless communications over wireless channel #8 to communication device 123-2.

At or around time T2, the access point controller resource 140 receives notification (via channel allocation information 170-2) to discontinue use of wireless channels 8-12. In one embodiment, instead of controlling all of the multiple wireless access points 120 from discontinuing use of the de-allocated particular wireless channel at the same time, or at random times, embodiments herein include controlling an order of the allocating use of wireless channels 8-12.

Note that the access point control resource 140 (management resource) may have a limited amount of time in which to discontinue use of the particular wireless channel after receiving a de-allocation notification as specified by channel allocation information 170-2. To limit an impact to communication devices that are currently in communication with a respective wireless access point using a respective wireless channel being de-allocated, the access point control resource 140 controls the sequential order of terminating use of the particular wireless channel by the multiple wireless access points 120 such that de-allocation of use is performed within a respective time limit and each of the communication devices is provided continuous communications with a network such as the Internet.

In accordance with further embodiments, the optimization engine 135 and/or access point controller resource 140 controls/manages detailed operations of terminating use of the de-allocated wireless channels 8-12. Embodiments herein include a solution in which the access point controller resource 140 communicate channel allocation changes to the wireless access points in a cluster, in an orderly phased manner to complete one or more channel de-allocation commands in a stipulated time limit.

For example, in one embodiment, the optimization engine 135 will ensure that the intended command such as channel vacation is completed within the stipulated time frame for the entire cluster wireless access points 120 located in the geographical region 101. This will free up use of the de-allocated and for use by the incumbent entity.

The optimization engine 135 can be configured to take into account a number of aspects in the following list when selecting the wireless access points (a.k.a. CBSDs) to receive the command for a given phase: CBSD, MNO and/or incumbent networks, number of active user devices being served by individual small cells; knowledge about the idle mode user devices in the network (metrics from EPC); upload/download—user plane traffic flowing through different cells, handover between small cells, current interference management measures in place and anticipated impact of the impending changes for the channel, power and other RF (Radio frequency) characteristics changes being imposed by the name of allocation management resource 160, knowledge of network deployment layout, operator service goals (mobility optimization, throughput enhancement, QoS compliance etc.), etc.

As further discussed herein, controlling the order of terminating use of the wireless channel by the multiple wireless access points can include scheduling termination of use of the wireless channel at different times (in different phases) amongst the multiple wireless access points such that a first portion of the multiple wireless access points supports communications over a new or available wireless channel (potentially as indicated by the channel allocation information) while a second portion of the multiple wireless access points temporarily supports communications over the particular wireless channel being terminated.

In accordance with a scheduled ordered manner of de-allocating usage of the particular wireless channel (channel being de-allocated) and completion of the de-allocation phases, eventually, all of the wireless access points discontinue using the particular wireless channel in accordance with the scheduled termination.

The scheduled orderly termination of using the particular wireless channel by the wireless access point can include multiple phases. For example, to implement new bandwidth usage requirements as specified by updated channel allocation information 170-2, during a first phase of the multiple phases, the management resource terminates use of the particular wireless channel by a first wireless access point and controls the first wireless access point to use a second wireless channel (such an available wireless channel that is allocated for use) to support subsequent wireless communications; subsequent to the first phase, during a second phase of the multiple phases, the management resource terminates use of the particular wireless channel by a second wireless access point and controls the second wireless access point to use a different wireless channel to support subsequent wireless communications; subsequent to the second phase, during a third phase of the multiple phases, the management resource terminates use of the particular wireless channel by a third wireless access point and controls the third wireless access point to use a different wireless channel to support subsequent wireless communications; and so on.

Figure 4:
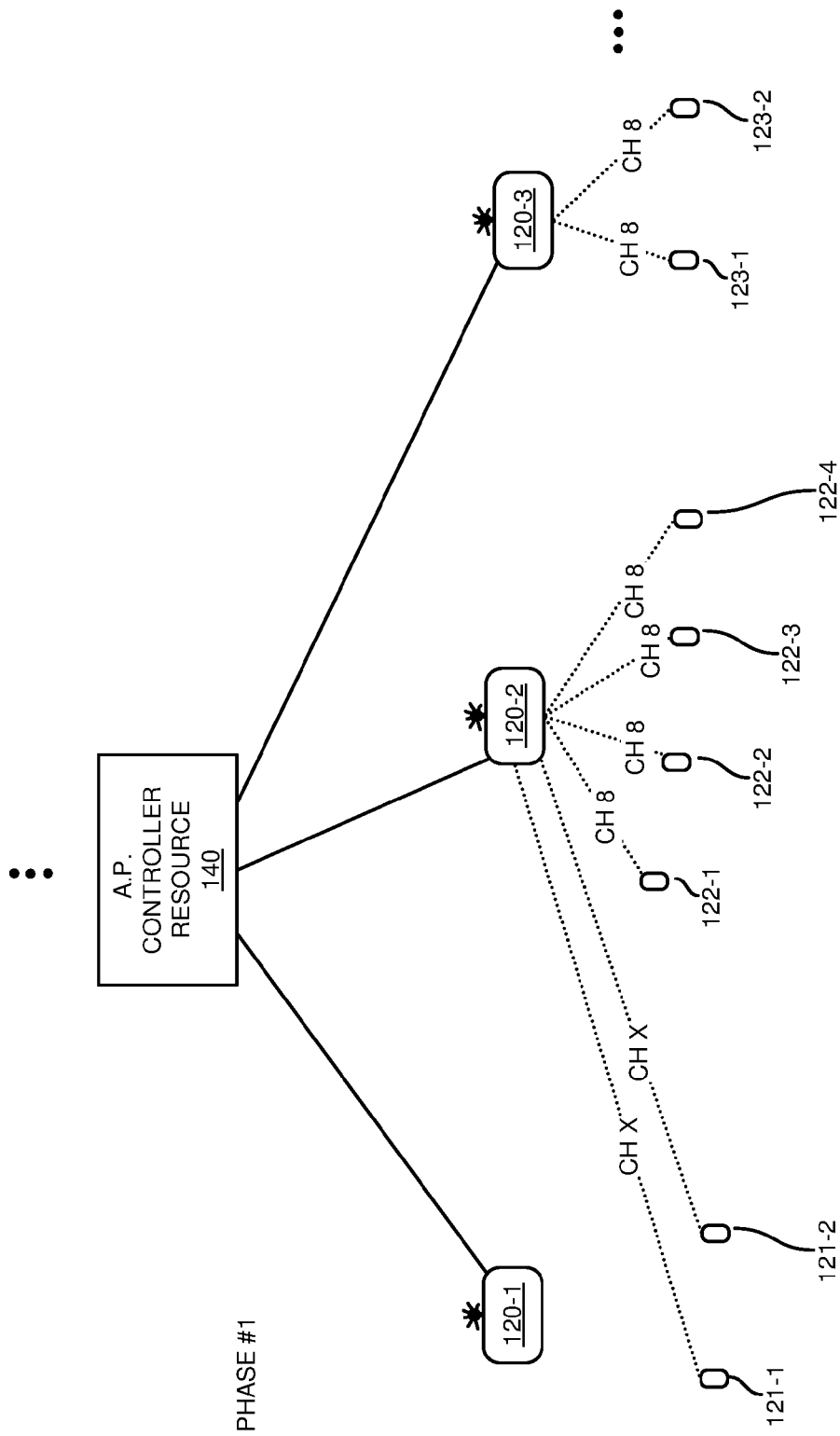
FIGS. 4-7 are example diagrams illustrating different phases of vacating use of a de-allocated wireless channel according to embodiments herein.

FIG. 4 is an example diagram illustrating a first phase of discontinuing use of a de-allocated wireless channel according to embodiments herein.

To execute phase #1, in accordance with the channel allocation information 170-2, the wireless access point control resource 140 and/or optimization engine 135 notifies the wireless access point 120-1 to handoff the mobile communication device 121-1 and mobile communication device 121-2 to wireless access point 120-2 because the wireless access point 120-1 currently uses de-allocated channel #8.

As shown in phase 1 of FIG. 4, the wireless access point 120-1 hands-off the communication devices 121-1 and 121-2 over to the wireless access point 128-2. Thus, the wireless access point 120-2 receives the handoff of communication device 121-1 and communication device 121-2.

During phase #1, the wireless access point 120-2 supports wireless connectivity to the communication devices 121-1 and 121-2 over channel X. Note that channel X can be any of channels 13-15 available (in time T2 to time T3) for use by the general authorized access users. In one embodiment, if temporary, and channel X is used before time T3 at which time none of the wireless access point should be using channels 8-12, channel X can be any of channels 8-12.

Note that to provide communication devices 121-1 and 121-2 continuous wireless connectivity to a remote network such as the Internet during the handoffs, the wireless access point 120-1 terminates the respective wireless communication links with communication devices 121-1 and 121-2 after the wireless access point 120-2 provides the communication devices 121-1 and 121-2 access to the Internet over respective wireless channel X. Thus, during the respective handoffs from wireless access point 120-1 to wireless access point 120-2, the communication devices 121-1 and 121-2 do not experience a loss of connectivity with the Internet or other network.

At the end of phase #1, the wireless access point 120-1 no longer uses any of the de-allocated wireless channels 8-12. The wireless access point 105-1 is free to provide communications over one or more new or previously allocated channels that have not been terminated such as wireless channel 13-15.

At the end of phase #1, however, wireless access points 120-2 and 120-3 still use channel #8, which has been de-allocated for use.

Figure 5:
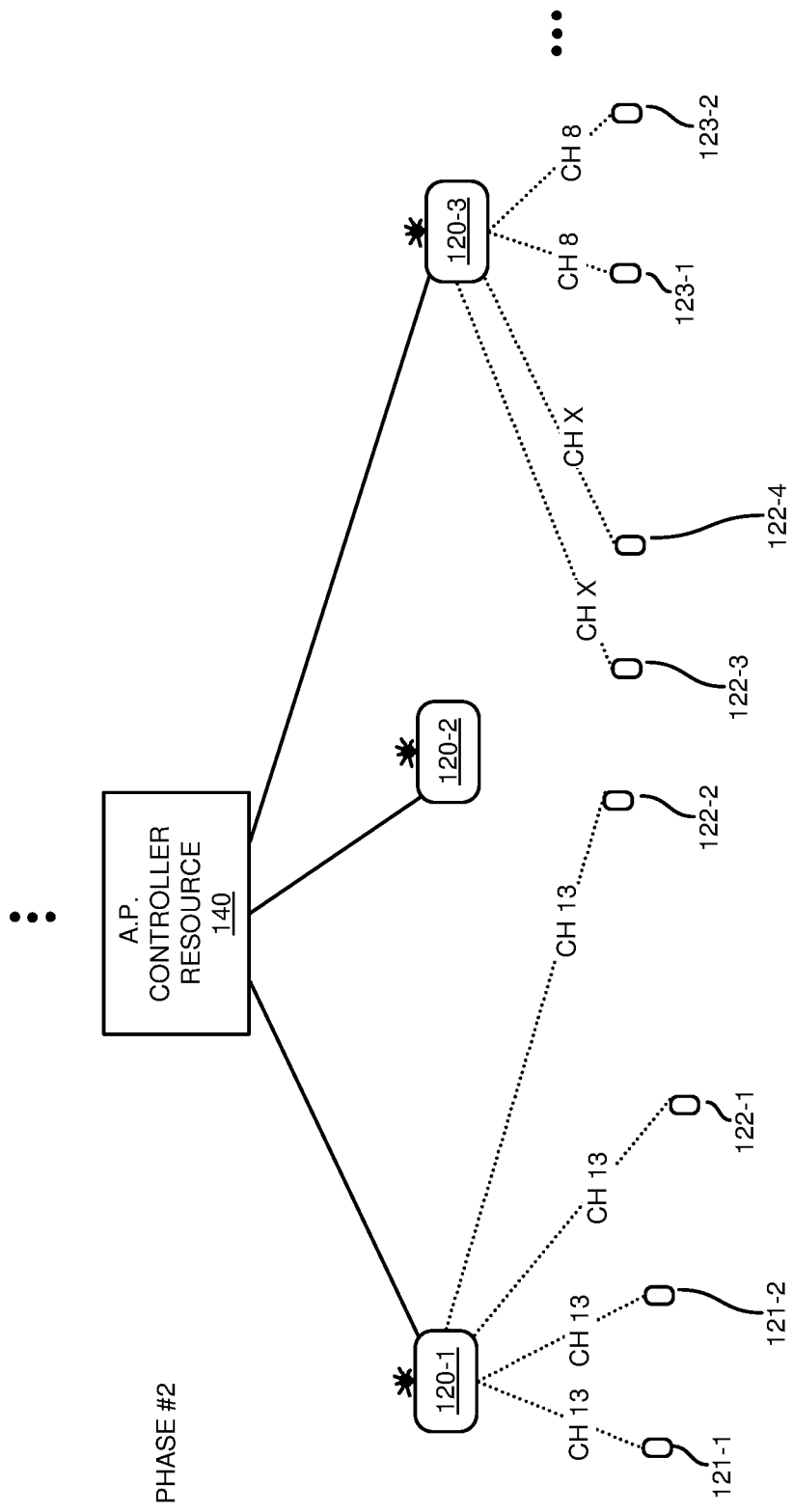

FIG. 5 is an example diagram illustrating a second phase of discontinuing use of a de-allocated wireless channel according to embodiments herein.

To execute phase #2, after completing phase #1, as specified by the channel allocation information 170-2, the wireless access point control resource 140 and/or optimization engine 135 notifies the wireless access point 120-2 to handoff at least the mobile communication devices 122-1, 122-2, 122-3, 122-4 to one or more nearby wireless access points.

As shown in phase 2 of FIG. 4, the wireless access point 120-2 hands-off the communication devices 121-1, 121-2, 122-1, 122-2, over to the wireless access point 120-1. Thus, the wireless access point 120-1 receives the handoff of these communication devices and supports communications over the newly allocated channel 13. Accordingly, the wireless access point 120-1 operates in conformance with the channel allocation information 170-2.

As further shown in phase 2 of FIG. 4, the wireless access point 120-2 hands-off the communication devices 122-3, 122-4, over to the wireless access point 120-3. Thus, the wireless access point 120-3 receives the handoff of these communication devices. In a similar manner as previously discussed, after the handoff, the wireless access point 120-3 supports wireless communications with the communication devices 122-3 and 122-4 over channel X. Note again that channel X can be any of channels 13-15 available (in time T2 to time T3) for use by the general authorized access users. In one embodiment, if temporary, and channel X is used before time T3 at which time none of the wireless access point should be using channels 8-12, channel X can be any of channels 8-12.

Note that to provide communication devices 121-1, 121-2, 122-1, 122-2, and 122-3, 122-4 continuous wireless connectivity to a remote network such as the Internet during the handoffs, the wireless access point 120-2 terminates the respective wireless communication links with these communication devices after the wireless access point 120-1 provides the communication devices 121-1, 121-2, 122-1, and 122-2 access to the Internet. Thus, during the respective handoffs from wireless access point 120-2 to wireless access point 120-1, the communication devices 121-1, 121-2, 122-1, and 122-2 do not experience a loss of connectivity (data delivery services) with the Internet or other network.

Further note that to provide communication devices 122-3 and 122-4 continuous wireless connectivity to a remote network such as the Internet during the handoffs, the wireless access point 120-2 terminates the respective wireless communication links with these communication devices after the wireless access point 120-3 provides the communication devices 122-3 and 122-4 access to the Internet.

Thus, during the respective handoffs from wireless access point 120-2 to wireless access point 120-3, the communication devices 122-3 and 122-4 do not experience a loss of connectivity with the Internet or other network. Accordingly, during channel termination, via wireless access point handoffs, the wireless access points 120: i) provide continuity of first data delivery services to the first set of communication devices 121, ii) provide continuity of data delivery services to the second set of communication devices 122, iii) provide continuity of data delivery services to the third set of communication devices 123, iv) provide continuity of data delivery services to the fourth set of communication devices 123.

At the end of phase #2, assume that the wireless access point 120-2 no longer uses any of the de-allocated wireless channels 8-12. The wireless access point 120-2 is free to provide communications over one or more new or previously allocated channels that have not been terminated such as wireless channel 13-15.

At the end of phase #2, however, wireless access point 120-3 still uses channel #8, which has been de-allocated for use.

Figure 6:
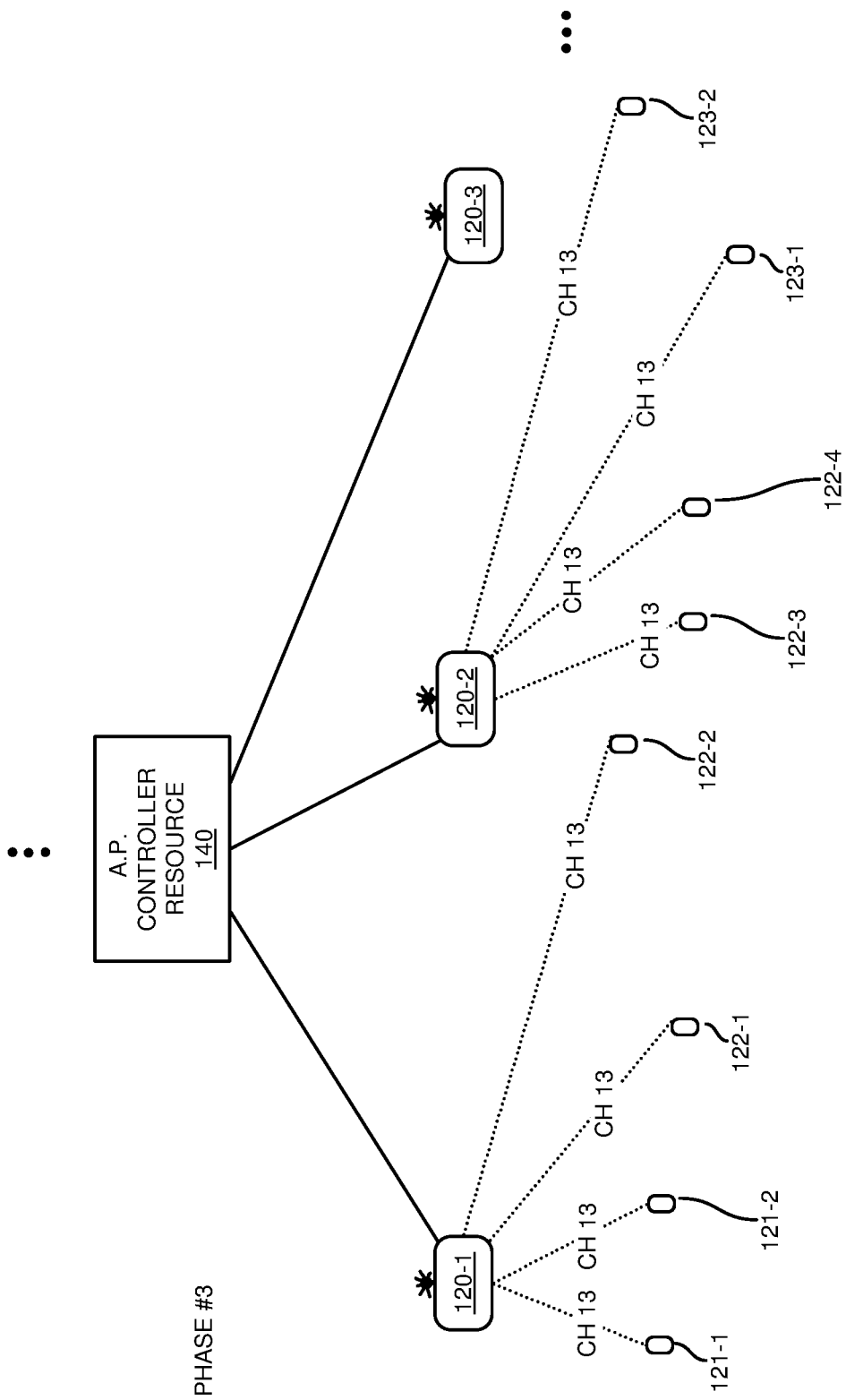

FIG. 6 is an example diagram illustrating a third phase of discontinuing use of a de-allocated wireless channel according to embodiments herein.

To execute phase #3, as specified by the channel allocation information 170-2, the wireless access point control resource 140 and/or optimization engine 135 notifies the wireless access point 120-3 to handoff the mobile communication devices 122-3, 122-4, 123-1, and 123-2 to wireless access point 120-2 so that wireless access point 120-3 no longer uses the de-allocated channel #8.

As shown in phase 1 of FIG. 4, the wireless access point 120-3 hands-off the communication devices 122-3, 122-4, 123-1, 123-2 over to the wireless access point 120-2. Thus, the wireless access point 120-2 receives the handoff of these communication devices.

Subsequent to the handoffs, the wireless access point 120-2 supports wireless connectivity to the communication devices 122-3, 122-4, 123-1, and 123-2 over any of the newly allocated channels 13-15.

At the end of phase #3, the wireless access point 120-3 no longer uses any of the de-allocated wireless channels 8-12. The wireless access point 120-3 is free to provide communications over one or more new or previously allocated channels that have not been terminated such as wireless channel 13-15.

In a similar manner, the access point controller resource 140 continues the process of terminating use of the de-allocated wireless channels 8-12 amongst each of the wireless access points in the geographical region 101 until none of the wireless access points in the geographical region 101 use wireless channels 8-12 in accordance with channel allocation information 170-1.

In one embodiment, as previously discussed, the optimization engine 135 and access point controller resource 140 complete termination of using the de-allocated channels within a predetermined time frame such as a time limit of between 5-60 seconds. Each handoff may take up to approximately 100 milliseconds to complete.

Figure 7:
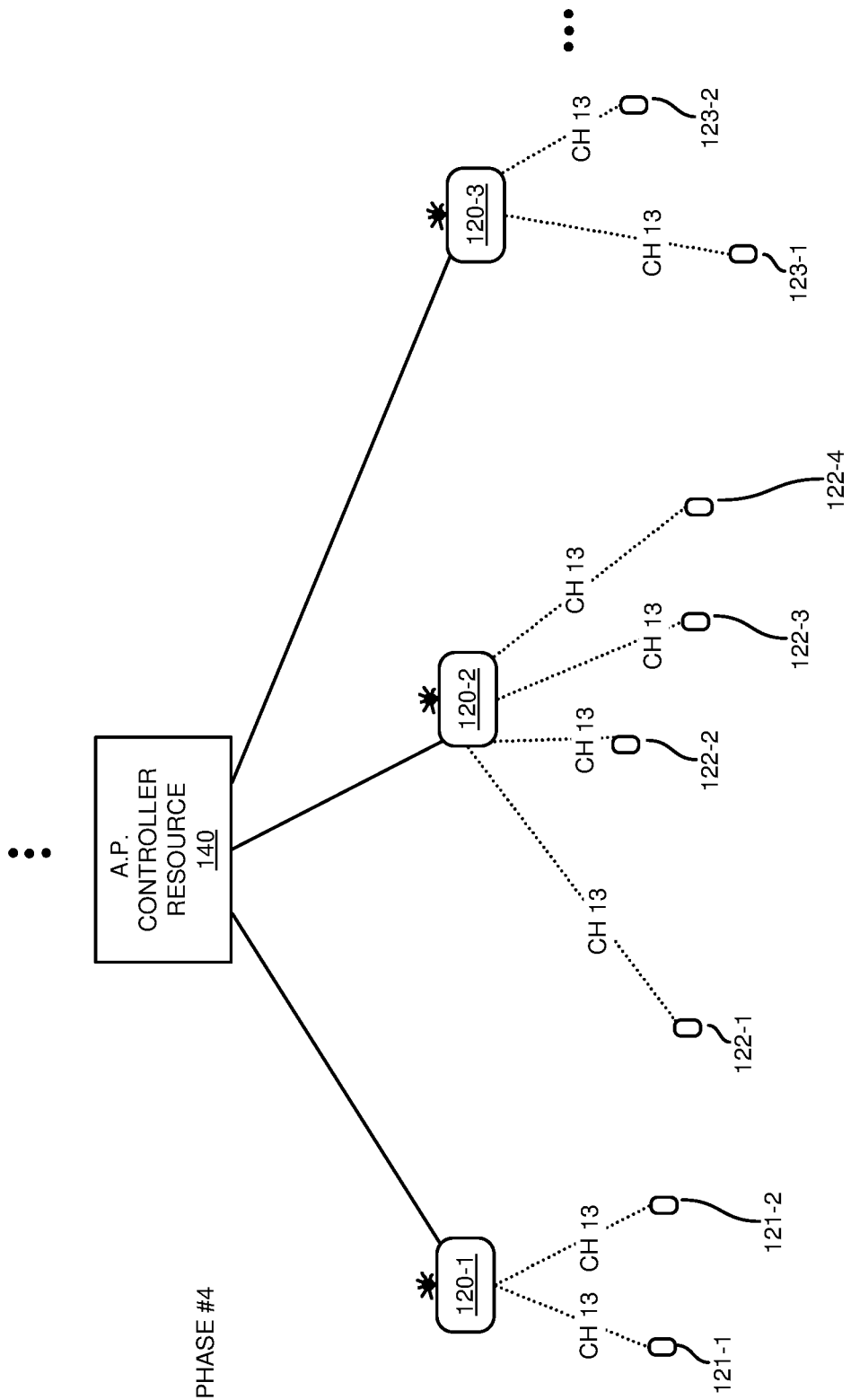

FIG. 7 is an example diagram illustrating client device load re-balancing amongst multiple wireless access points according to embodiments herein.

In phase #4 of the allocation de-allocation process, via one or more handoffs, the access point controller resource 140 and/or optimization engine 135 rebalances a distribution of communication devices to respective wireless access points 120 as shown. For example, the wireless access point supports wireless communications with communication device 121-1 as well as communication device 121-2. Wireless access point 120-2 supports wireless communications with communication device 122-1, 122-2, 122-3, and 122-4. Wireless access point 120-3 supports wireless communications with communication device 123-1 and 123-2.

FIGS. 8-11 illustrate how the access point control resource 140 can be configured to initiate de-allocation of using a respective channel in parallel according to embodiments herein.

Figure 8:
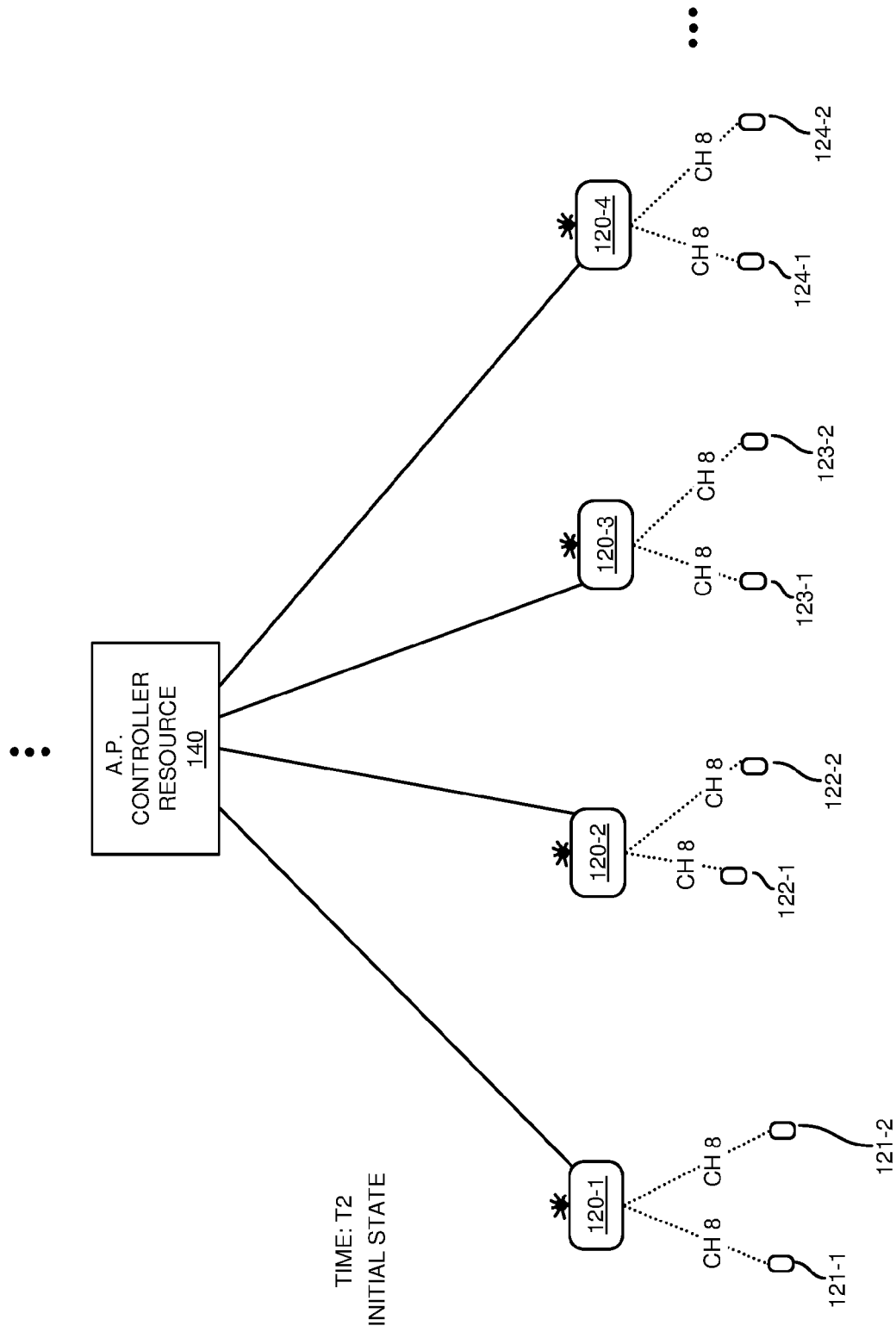
FIGS. 8-11 are example diagrams illustrating different phases of vacating use of a de-allocated wireless channel according to embodiments herein.

In FIG. 8, at or around time T1 up to time T2, wireless access point 120-1 supports wireless communications with communication devices 121-1 and 121-2; wireless access point 120-2 supports wireless communications with communication devices 122-1 and 122-2; wireless access point 120-3 supports wireless communications with communication device 123-1 and 123-2; wireless access point 120-4 supports wireless medications with communication device 124-1 and 124-2.

Figure 9:
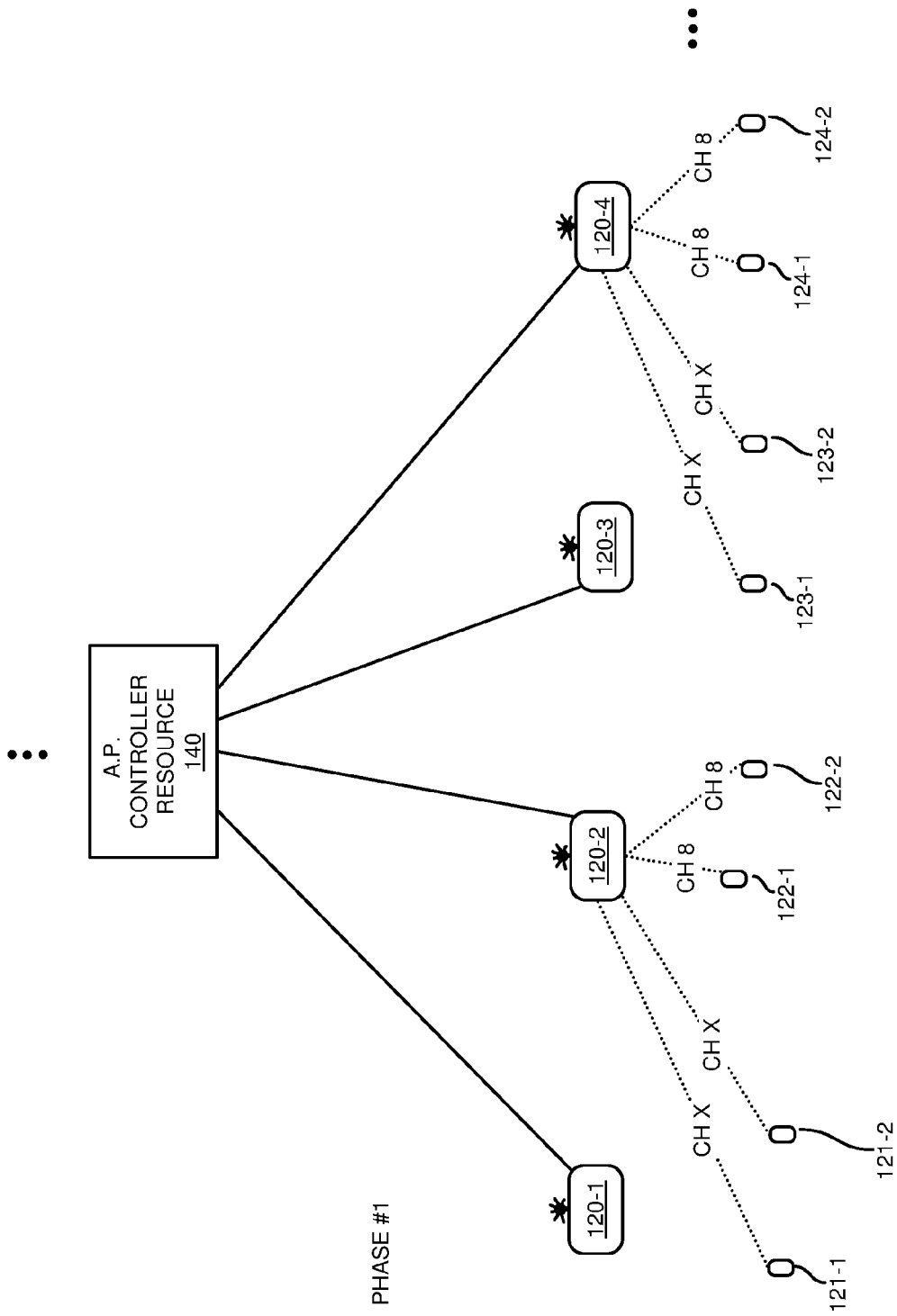

As shown in FIG. 9, in accordance with the channel allocation information 170-2, during phase #1, the access point controller resource 140 initiates a handoff of communication devices 121-1 and 121-2 to wireless access point 120-2. Access point controller resource 140 further initiates a handoff of communication device 123-1 and 123-2 to wireless access point 120-4.

Accordingly, in the phase #1, wireless access point 120-1 and wireless access point 120-3 no longer use the de-allocated channel 8.

Figure 10:
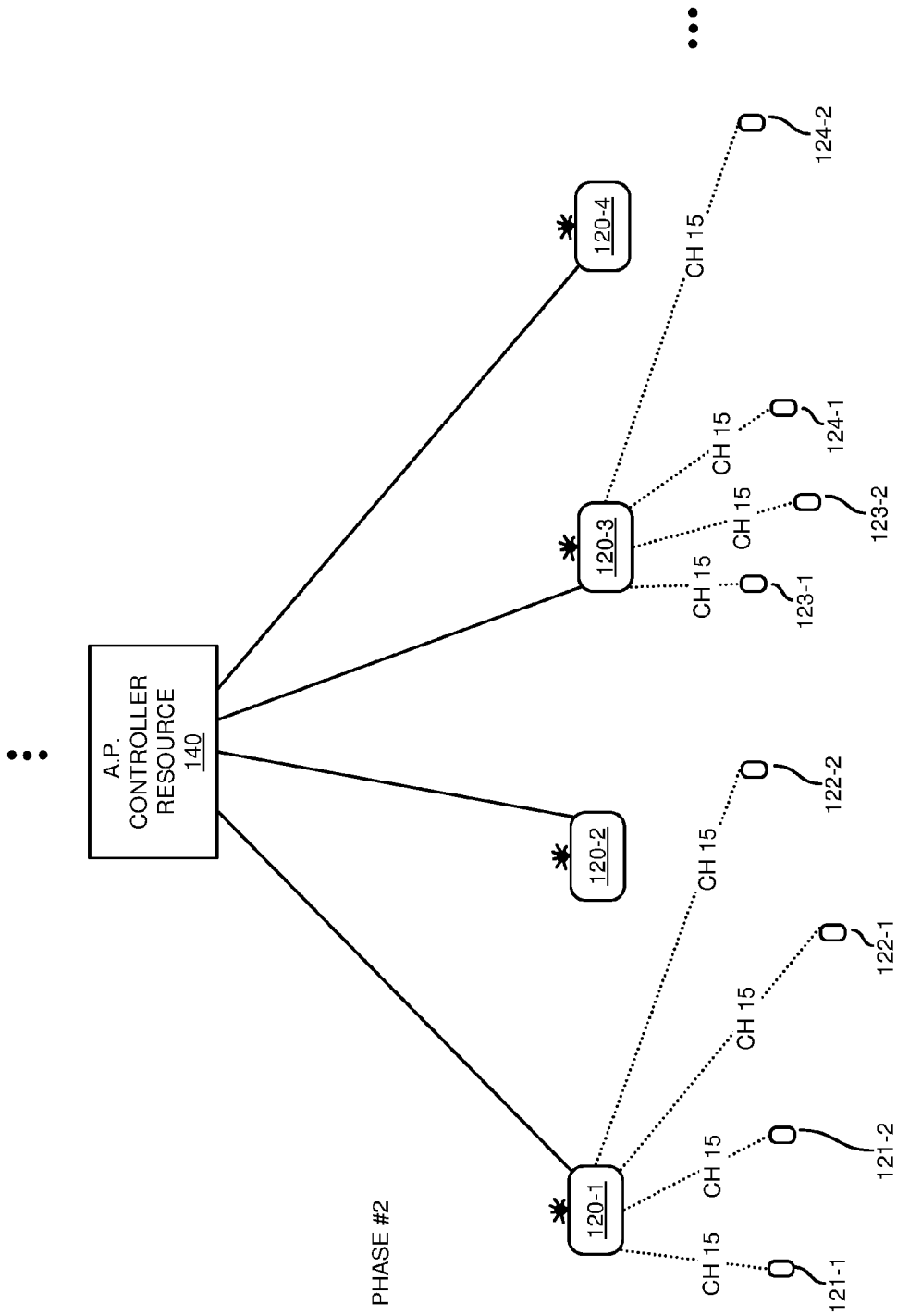

As shown in FIG. 10, during phase #2, subsequent to completing phase #1, the access point controller resource 140 initiates a handoff of communication devices 121-1, 121-2, 122-1, and 122-2 from wireless access point 120-2 to wireless access point 120-1. Access point controller resource 140 further initiates a handoff of communication devices 123-1, 123-2, 124-1, and 124-2 from wireless access point 120-4 to wireless access point 120-3.

Accordingly, at the end of phase #2, none of the wireless access points in the geographical region 101 use the de-allocated channel 8.

Figure 11:
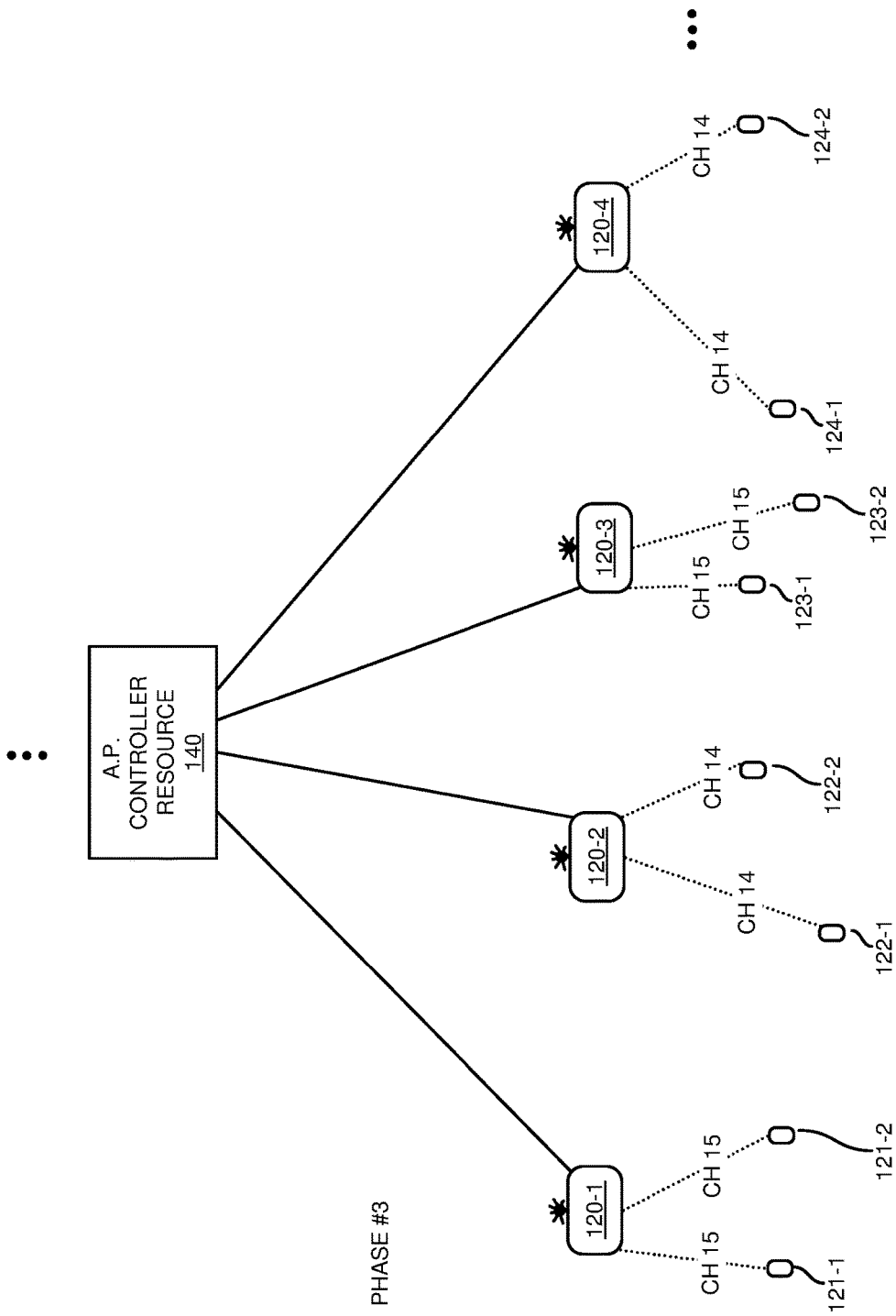

FIG. 11 is an example diagram illustrating client device load re-balancing amongst multiple wireless access points according to embodiments herein.

In phase #3, subsequent to completing phase #2, via one or more handoffs, the access point controller resource 140 and/or optimization engine 135 rebalances a distribution of communication devices to wireless access points 120 as shown. For example, subsequent to rebalancing, the wireless access point 120-1 supports wireless communications with communication device 121-1 as well as communication device 121-2; wireless access point 120-2 supports wireless communications with communication device 122-1 and 122-2; wireless access point 120-3 supports wireless communications with communication devices 123-1 and 123-2; wireless access point 120-4 supports wireless communications with communication devices 124-1 and 124-2.

Figure 12:
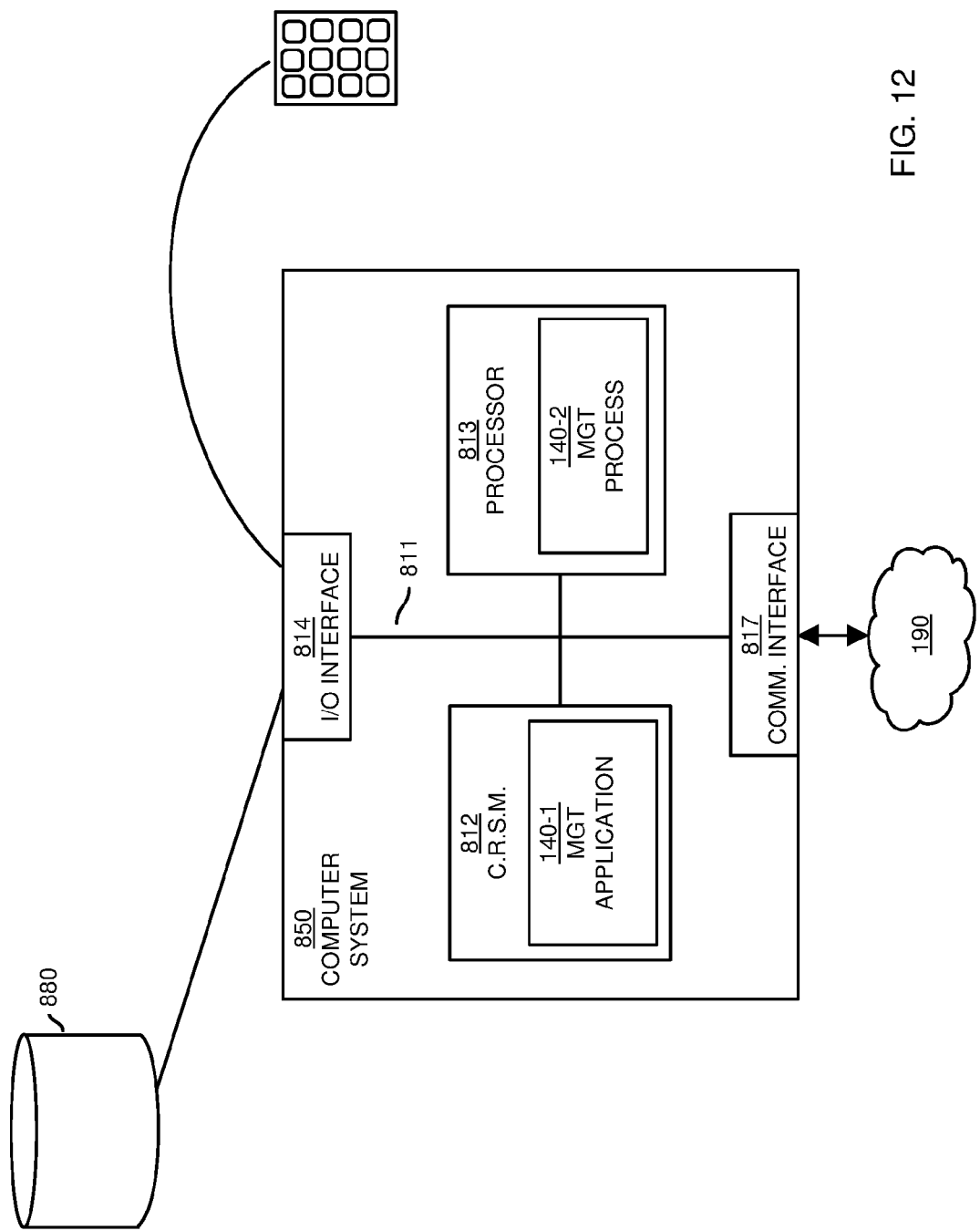
FIG. 12 is an example diagram illustrating a computer architecture in which to execute one or more embodiments as discussed herein.

FIG. 12 is an example block diagram of a computer system for implementing any of the operations as discussed herein according to embodiments herein.

Any of the resources (e.g., bandwidth allocation management resource 160, server resource 155, access point controller resource 140, optimization engine 135, wireless access points 120, etc.) can be configured to include a processor and executable instructions to carry out the different operations as discussed herein.

As shown, computer system 850 of the present example can include an interconnect 811 that couples computer readable storage media 812 such as a non-transitory type of media (i.e., any type of hardware storage medium) in which digital information can be stored and retrieved, a processor 813 (computer processor hardware), I/O interface 814, and a playbacks interface 818.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with content management application 140-1 (e.g., including instructions) to carry out any of the operations as discussed herein associated with the bandwidth allocation manager resource 160, server resource 155, optimization engine 135, access point controller resource 140, wireless access points 120, etc.

During operation of one embodiment, processor 813 accesses computer readable storage media 812 via the use of interconnect 811 in order to launch, run, execute, interpret or otherwise perform the instructions in content management application 140-1 stored on computer readable storage medium 812. Execution of the content management application 140-1 produces content management process 140-2 to carry out any of the operations and/or processes as discussed herein.

Those skilled in the art will understand that the computer system 850 can include other processes and/or software and hardware components, such as an operating system that controls allocation and use of hardware resources to content management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc.

The computer system 850 may reside at any location or can be included in any suitable resource in any network environment to implement functionality as discussed herein.

Functionality supported by the different resources will now be discussed via flowcharts in FIGS. 13-14. Note that the steps in the flowcharts below can be executed in any suitable order.

Figure 13:
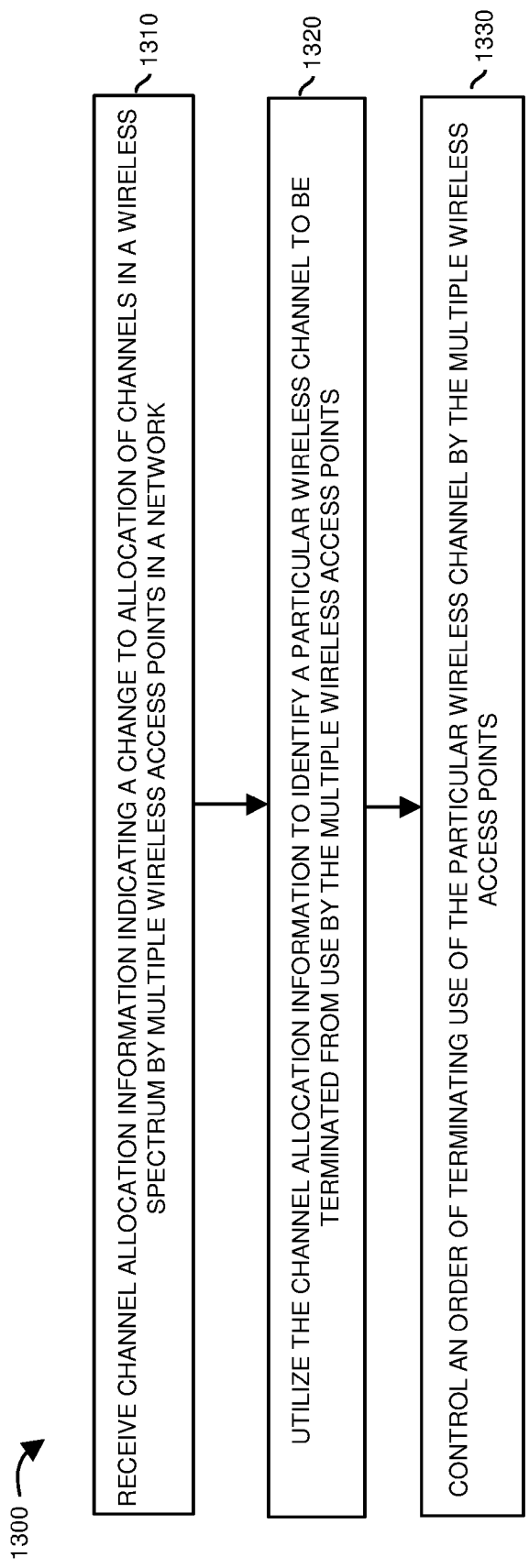
FIGS. 13-14 are example diagrams illustrating various methods according to embodiments herein.

FIG. 13 is a flowchart 1300 illustrating an example method according to embodiments. Note that there will be some overlap with respect to concepts as discussed above.

In processing operation 1310, the access point controller resource 140 receives channel allocation information 170-2 indicating a change to allocation of channels in a wireless spectrum for use by multiple wireless access points 120 in a network environment 100.

In processing operation 1320, the access point controller resource 140 utilizes the channel allocation information 170-2 to identify a particular wireless channel (such as a de-allocated channel) to be terminated from use by the multiple wireless access points 120.

In processing operation 1330, the access point control resource 140 controls an order of terminating use of the particular wireless channel by the multiple wireless access points 120.

Figure 14:
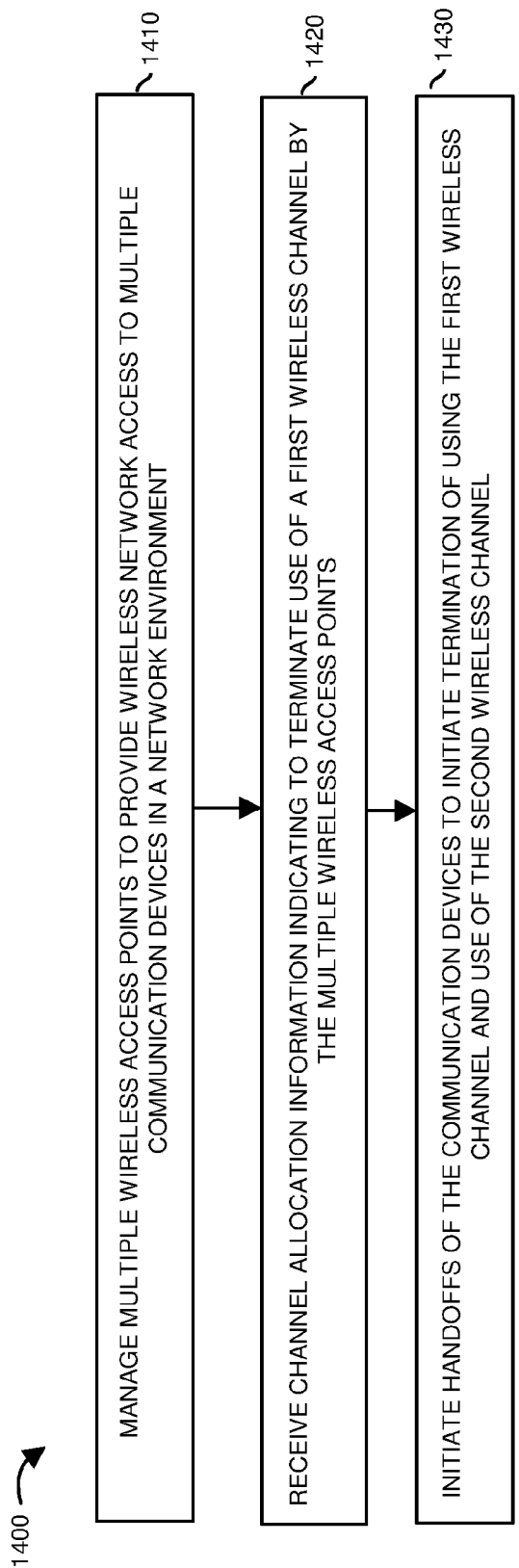

FIG. 14 is a flowchart 1400 illustrating an example method according to embodiments. Note that there will be some overlap with respect to concepts as discussed above.

In processing operation 1410, the access point controller resource 140 manages multiple wireless access points 120 to provide wireless network access to multiple communication devices in a network environment 100.

In processing operation 1420, the access point control resource 140 receives channel allocation information 170-2 indicating to terminate use of a first wireless channel by the multiple wireless access points 120, the access control information 170-2 indicating that a second wireless channel is available (allocated) for use.

In processing operation 1430, to accommodate the termination of using the first wireless channel, the access point control resource 140 initiates handoffs of the communication devices amongst the multiple wireless access points to terminate use of the first wireless channel.

Note again that techniques herein are well suited to support shared use of available wireless bandwidth in a wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    managing multiple wireless access points to provide wireless network access to multiple communication devices in a network environment;
    receiving channel allocation information indicating to terminate use of a first wireless channel by the multiple wireless access points; and
    initiating handoffs of the communication devices amongst the wireless access points to terminate use of the first wireless channel by the multiple wireless access points.

2. The method as in claim 1 further comprising:
    controlling an order of the multiple wireless access points terminating use of the first wireless channel.

3. The method as in claim 2, wherein controlling the order includes:
    implementing bandwidth usage as specified by the channel allocation information over multiple phases;
    during a first phase of the multiple phases: terminating use of the first wireless channel by a first wireless access point and controlling the first wireless access point to use a second wireless channel to support subsequent wireless communications; and
    subsequent to the first phase, during a second phase of the multiple phases: terminating use of the first wireless channel by a second wireless access point and controlling the second wireless access point to use the second wireless channel to support subsequent wireless communications.

4. The method as in claim 2, wherein the multiple wireless access points includes a first wireless access point and a second wireless access point;
    wherein controlling the order of the multiple wireless access points terminating use of the first wireless channel includes: controlling the second wireless access point to terminate use of the first wireless channel after the first wireless access point completes termination of the first wireless channel.

5. The method as in claim 2, wherein the handoffs of the communication devices results in discontinued use of the first wireless channel by the multiple wireless access points.

6. The method as in claim 1, wherein initiating the handoffs includes:
    notifying a first wireless access point of the multiple wireless access points to handoff a first communication device from the first wireless access point to a second wireless access point; and
    initiating a handoff of the first communication device from the second wireless access point back to the first wireless access point, the first wireless access point supporting communications with the first communication device using a second wireless channel instead of the first wireless channel.

7. The method as in claim 1, wherein the multiple wireless access points includes a first wireless access point and a second wireless access point, the first wireless access point using the first wireless channel to communicate with a first set of communication devices, the second wireless access point using the first wireless channel to communicate with a second set of communication devices; and
    the method further comprising: terminating use of the first wireless channel by the second wireless access point after the first wireless access point has completed terminating use of the first wireless channel.

8. The method as in claim 1 further comprising:
    completing termination of the multiple wireless access points using the first wireless channel to be within a specified time limit.

9. The method as in claim 1 further comprising:
    during termination of using the first wireless channel, via wireless access point handoffs: i) providing continuity of first data delivery services to a first set of communication devices, and ii) providing continuity of data delivery services to a second set of communication devices.

10. The method as in claim 9, wherein providing the continuity further comprises:
discontinuing use of the first wireless channel to communicate with the first set of communication devices; and
initiating use of a second wireless channel as specified by the channel allocation information to support continued communications with the second set of communication devices.

11. The method as in claim 1 further comprising:
notifying a first wireless access point of the multiple wireless access points to discontinue use of the first wireless channel; and
notifying a second wireless access point of the multiple wireless access points to discontinue use of the first wireless channel.

12. The method as in claim 1 further comprising:
implementing bandwidth usage as specified by the channel allocation information over multiple phases including a first phase and a second phase;
during the first phase of the multiple phases: terminating use of the first wireless channel by a first wireless access point and controlling the first wireless access point to use a second wireless channel to support subsequent wireless communications; and
subsequent to the first phase, during the second phase of the multiple phases: terminating use of the first wireless channel by a second wireless access point and controlling the second wireless access point to use the second wireless channel to support subsequent wireless communications.

13. The method as in claim 1, further comprising:
scheduling termination of use of the first wireless channel at different times such that a first portion of the multiple wireless access points supports communications over a new wireless channel as indicated by the channel allocation information while a second portion of the multiple wireless access points temporarily supports communications over the first wireless channel to be terminated.

14. The method as in claim 1 further comprising:
initiating discontinued use of the first wireless channel amongst the wireless access points at different times to terminate use of the first wireless channel by the multiple wireless access points.

15. The method as in claim 1 further comprising:
deriving an order in which to terminate use of the first wireless channel based on respective data communication loads supported by the wireless access points.

16. The method as in claim 1 further comprising:
producing an order to indicate to initially terminate use of the first wireless channel by a first set of wireless access points supporting a first data communication load followed by termination of use of the first wireless channel by a second wireless access point supporting a second data communication load, the second data communication load greater than the first data communication load.

17. The method as in claim 1, wherein the multiple wireless access points includes a first wireless access point and a second wireless access point;
wherein initiating the handoffs of the communication devices includes:
terminating use of the first wireless channel by the first wireless access point; and
terminating use of the first wireless channel by the second wireless access point.

18. The method as in claim 1, wherein the multiple wireless access points includes a first wireless access point and a second wireless access point, the method further comprising:
terminating use of the first wireless channel by the first wireless access point and controlling the first wireless access point to use a second wireless channel to support subsequent wireless communications; and
terminating use of the first wireless channel by the second wireless access point and controlling the second wireless access point to use the second wireless channel to support subsequent wireless communications.

19. The method as in claim 1, wherein initiating the handoffs includes:
discontinuing use of the first wireless channel to communicate with a first set of communication devices; and
initiating use of a second wireless channel to support communications with the first set of communication devices.

20. An apparatus comprising:
a wireless access point controller resource in control of multiple wireless access points, the wireless access point controller resource including computer processor hardware operable to:
manage the multiple wireless access points to provide wireless network access to multiple communication devices in a network environment;
receive channel allocation information indicating to terminate use of a first wireless channel by the multiple wireless access points; and
initiate handoffs of the communication devices amongst the wireless access points to terminate use of the first wireless channel by the multiple wireless access points.

21. The apparatus as in claim 20, wherein the wireless access point controller resource is further operable to:
control an order of the multiple wireless access points terminating use of the first wireless channel.

22. The apparatus as in claim 21, wherein the wireless access point controller resource is further operable to:
implement bandwidth usage as specified by the channel allocation information over multiple phases;
during a first phase of the multiple phases: terminate use of the first wireless channel by a first wireless access point and controlling the first wireless access point to use a second wireless channel to support subsequent wireless communications; and
subsequent to the first phase, during a second phase of the multiple phases: terminate use of the first wireless channel by a second wireless access point and controlling the second wireless access point to use the second wireless channel to support subsequent wireless communications.

23. The apparatus as in claim 20, wherein the wireless access point controller resource is further operable to:
produce an order in which to terminate use of the first wireless channel by a first set of wireless access points supporting a first data communication load followed by initiating termination of use of the first wireless channel by a second wireless access point supporting a second data communication load, the second communication load greater than the first data communication load.

24. The apparatus as in claim 20, wherein the multiple wireless access points includes a first wireless access point and a second wireless access point, the first wireless access point using the first wireless channel to communicate with a first set of communication devices, the second wireless access point using the first wireless channel to communicate with a second set of communication devices; and wherein the wireless access point controller resource is further operable to: terminate use of the first wireless channel by the second wireless access point after the first wireless access point has completed terminating use of the first wireless channel.

25. The apparatus as in claim 20, wherein the wireless access point controller resource is further operable to:

complete termination of using the first wireless channel by the multiple wireless access points to be within a specified time limit.

26. The apparatus as in claim 20, wherein the wireless access point controller resource is further operable to:

during termination of using the first wireless channel, via wireless access point handoffs: i) provide continuity of first data delivery services to a first set of communication devices, and ii) provide continuity of data delivery services to a second set of communication devices.

27. The apparatus as in claim 26, wherein the wireless access point controller resource is further operable to:

discontinue use of the first wireless channel to communicate with the first set of communication devices; and provide notification to use a second wireless channel as specified by the channel allocation information to support continued communications with the second set of communication devices.

28. The apparatus as in claim 20, wherein the wireless access point controller resource is further operable to:

notify a first wireless access point of the multiple wireless access points to discontinue use of the first wireless channel; and notify a second wireless access point of the multiple wireless access points to discontinue use of the first wireless channel.

29. The apparatus as in claim 20, wherein the wireless access point controller resource is further operable to:

schedule termination of use of the first wireless channel at different times such that a first portion of the multiple wireless access points supports communications over a new wireless channel as indicated by the channel allocation information while a second portion of the multiple wireless access points temporarily supports communications over the first wireless channel to be terminated.

30. The apparatus as in claim 20, wherein the wireless access point controller resource is further operable to:

discontinue use of the first wireless channel amongst the wireless access points at different times.

31. Non-transitory computer-readable storage media having instructions stored thereon, the instructions, when carried out by computer processor hardware, cause the computer processor hardware to:

manage multiple wireless access points to provide wireless network access to multiple communication devices in a network environment;

receive channel allocation information indicating to terminate use of a first wireless channel by the multiple wireless access points; and initiate handoffs of the communication devices amongst the wireless access points to terminate use of the first wireless channel by the multiple wireless access points.

\* \* \* \* \*